United States Patent
Salzman et al.

(10) Patent No.: US 10,428,298 B1
(45) Date of Patent: Oct. 1, 2019

(54) METHANOL SLICING OF WINE

(71) Applicants: James Fred Salzman, Anna, TX (US); Carl Michael Panasik, Garland, TX (US)

(72) Inventors: James Fred Salzman, Anna, TX (US); Carl Michael Panasik, Garland, TX (US)

(73) Assignees: James Fred Salzman, Anna, TX (US); Carl Michael Panasik, Garland, TX (US)

( * ) Notice: Subject to any disclaimer, the term of this patent is extended or adjusted under 35 U.S.C. 154(b) by 0 days.

(21) Appl. No.: 16/173,017

(22) Filed: Oct. 29, 2018

(51) Int. Cl.
| | |
|---|---|
| *C12G 3/08* | (2006.01) |
| *B01D 3/00* | (2006.01) |
| *B01D 3/10* | (2006.01) |
| *C12C 12/00* | (2006.01) |
| *C12F 3/06* | (2006.01) |

(52) U.S. Cl.
CPC .............. *C12G 3/08* (2013.01); *B01D 3/005* (2013.01); *B01D 3/10* (2013.01); *C12C 12/00* (2013.01); *C12F 3/06* (2013.01); *B01D 2257/70* (2013.01)

(58) Field of Classification Search
CPC . B01D 3/005; B01D 3/10; C12G 3/00; C12G 3/08; C12C 12/00; C12F 3/00; C12F 3/06
See application file for complete search history.

(56) References Cited

U.S. PATENT DOCUMENTS

| | | | | |
|---|---|---|---|---|
| 3,052,546 A | * | 9/1962 | Riddell ..................... | C12G 3/08 426/15 |
| 4,626,437 A | * | 12/1986 | Schobinger .............. | C12G 3/08 426/14 |
| 4,784,868 A | * | 11/1988 | Young ...................... | C07C 29/86 203/19 |
| 4,867,997 A | * | 9/1989 | Wiesenberger .... | B01D 11/0203 426/387 |
| 4,978,547 A | * | 12/1990 | Petershans ............... | B01D 1/26 159/47.1 |
| 5,720,856 A | * | 2/1998 | Pirone ...................... | B01D 3/42 159/44 |
| 5,897,904 A | * | 4/1999 | Friedman ................. | C12H 6/00 426/494 |
| 6,019,034 A | * | 2/2000 | Ford, Sr. .................. | C12H 1/16 141/65 |
| 8,628,643 B2 | * | 1/2014 | Grady ..................... | B01D 3/002 203/2 |
| 8,889,201 B2 | * | 11/2014 | Tatera ....................... | C12C 3/08 426/14 |

(Continued)

*Primary Examiner* — Jonathan Miller

(57) ABSTRACT

A method and apparatus are presented for reducing the methanol content in a fermented solution to create forms healthier to human consumption, thereby reducing headaches and hangovers. In accordance with the disclosed embodiments, the fermented solution is placed in a vacuum vessel and heated to a fixed temperature. Pulling a fixed vacuum within the vessel lowers the boiling point of the solution, creating a vapor selectively of the low-end congeners, for example, methanol. The methanol-rich vapor is condensed and disposed leaving a healthier fermented solution with reduced methanol content. In some embodiments, the fixed temperature is lower than or equal to 32 degrees C. which preserves the aroma and taste of the fermented solution.

12 Claims, 7 Drawing Sheets

(56) References Cited

U.S. PATENT DOCUMENTS

| | | | |
|---|---|---|---|
| 9,200,243 B2 * | 12/2015 | Mosier | C12G 3/08 |
| 9,487,743 B2 * | 11/2016 | Tatera | C12C 3/08 |
| 9,868,929 B2 * | 1/2018 | Tatera | C12C 3/08 |
| 2013/0334104 A1 * | 12/2013 | Halas | B01D 3/02 208/348 |
| 2015/0044328 A1 * | 2/2015 | Rubin | A23G 3/364 426/15 |
| 2016/0316802 A1 * | 11/2016 | Yokoyama | A23L 2/56 |

* cited by examiner

METHANOL SLICING OF WINE

FIELD OF INVENTION

The present invention relates to a process for reducing the methanol content in fermented solutions. The method and apparatus presented for reducing the methanol content in a fermented solution enables one to create forms healthier to human consumption, thereby reducing headaches and hangovers.

BACKGROUND

Yeast is a microorganism that belongs to the Fungi kingdom. It is found widely in nature and is used in making some of our favorite foods and drinks. It is well known that yeast converts sugars to alcohol. Yeast creates two major byproducts during fermentation: ethanol (alcohol) and carbon dioxide, while under the absence of oxygen. Alternatively, yeast multiplies in the presence of oxygen. Yeasts are eukaryotic, single-celled microorganisms classified as members of the fungus kingdom. There are currently some 1,500 species that are currently identified. A particular strain of yeast can alter the flavor of the final alcoholic beverage. Yeast strains also alters the alcoholic concentration to various degrees, typically in the 3-18% range depending on the sugar concentration. These fungi, are used in many malted grain fermentations such as corn, barley, rye, wheat, hops, etc. to produce beer, and form the basis of spirits for alcoholic beverages. Any sugar-based solution including honey can be used in the fermentation process. Fruit based solutions can be also used in these fermentation processes to make wine.

It is well known that these fermented solutions, usually referred to as wash, or wort, can be distilled to produce ethanol or concentrated alcoholic spirits such as vodka, whiskey, etc. The process of distillation does not make alcohol; it only concentrates alcohol to increase the proof. Often flavors are added or diffused in distilled spirits to create various flavored spirits, i.e. gin, etc.

Further, fermented solutions may contain methanol, an alcohol that is poisonous to humans.

SUMMARY

The present disclosure provides an apparatus and process for reducing contaminants such as methanol in fermented solutions such as wine to create forms healthier to human consumption. One use of this apparatus and process is to remove from fermented solutions, contaminants know as congeners, which contribute to hangovers and illness in humans. The method of the present disclosure does not involve the application and re-application of high temperatures necessary for the single or multiple-distillation process utilized in the production of spirits. Such a process applied to the more fragile fermented solutions such as wine would lead to significant evaporation losses and subsequently harm the taste and aroma of the wine.

The fermented solution containing alcohol to be treated is placed in a vessel capable of withstanding a vacuum of approximately 1.0 torr, leaving room for head space. The solution is then heated to a specified temperature. The solution may or may not be circulated. A vacuum is applied to the head space within the vessel. The vacuum draws out residual fermentation $CO_2$ gasses including some $SO_2$, and then draws contaminants, i.e. methanol in the form of micro-bubbles to either be condensed (distilled) or vented. A specified quantity of distilled contaminants is removed, and the process is terminated.

The apparatus and method of the present disclosure allow wineries and other manufacturers of alcoholic beverages to remove contaminants that contribute to hangovers or illness in humans and thus improve the product health benefits. This can be done quickly, with ease, and at any time after fermentation without complex distillation apparatus or costly extraction/separation techniques such as those relying on acoustic energy or physical adsorption. The apparatus and method of the present disclosure achieve purification of alcohol products without multiple distillation steps and with negligible losses of ethanol alcohol, and aromas.

BRIEF DESCRIPTION OF THE DRAWINGS

A better understanding of this invention can be obtained when the following detailed description of the preferred embodiment is considered in conjunction with the following drawings, in which.

DETAILED DESCRIPTION OF THE PREFERRED EMBODIMENTS

Common Distillation Process

There are many ways to distill or separate the alcohol from fermented liquids, specifically ethanol, one of the main byproducts of the yeast conversion of sugars. Yeast conversion of malted corn into ethanol and its associated distillation is a well-known process used by so called moonshiners and is in high volume production today as a fuel additive to automobile gasoline. There are many ways to distill ethanol from fermented solutions using so called distillation apparatus or stills. A still can be found in many forms including copper or stainless pot stills, column stills, or combinations of these called hybrids. Both forms of stills have their purposes: For vodka, white rum, London dry gin—clear spirits—a column still is typically used. For single-malt Scotch, mescal, navy rum, or anything rich in flavor a pot still is preferred. The exception here being bourbon and rye, which are made using column stills but run at pot-still levels of efficiency.

Distillation stills or apparatus work on the principle of vaporizing a fermented solution by the application of heat to the fermented solution, and then (in another section) cooling the vapor to condense the vapor into a liquid. Since alcohols boil at a lower temperature ~78 degrees C. (173 degrees F.), than water at 100 degrees C. (212 degrees F.), it is a common technique to start at room temperature and slowly raise the temperature of a fermented solution until the alcohols begins to distill (first) out of the solution. This procedure is typically performed at atmospheric pressure.

Figure 1:
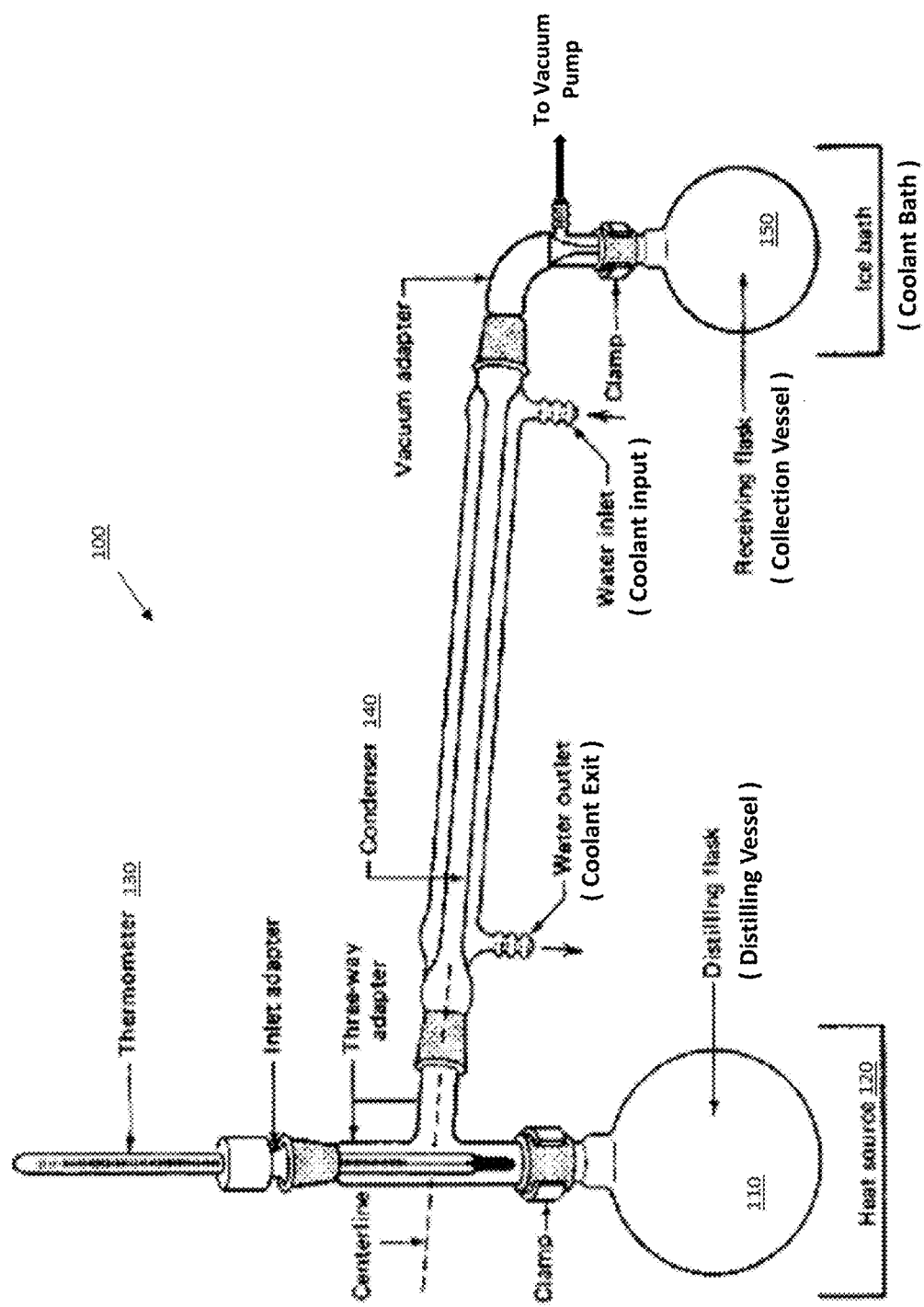
FIG. 1 is a typical laboratory distillation setup consisting. This common distillation apparatus utilizes a vessel capable of withstanding being under vacuum, heated by a heat source and a cooled condenser to convert the vapor to an extractable liquid. Courtesy of *The Organic Chemistry Laboratory Survival Manual*, James W. Zubrick, John Wiley & Sons, Inc., 1988, page 154.

FIG. 1 presents the schematic of a common distillation apparatus 100. The fermented alcohol solution 110 is placed in vessel capable of being heated by a heat source 120. The temperature of the alcohol solution is monitored by a common physical bulb or electronic thermometer 130. As the solution reaches the temperature at which the desired component vaporizes, the component vapor is cooled via circulating cooled water or coolant in the condenser 140 and the condensed liquid is collected in the receiving (collection) vessel 150.

Figure 2:
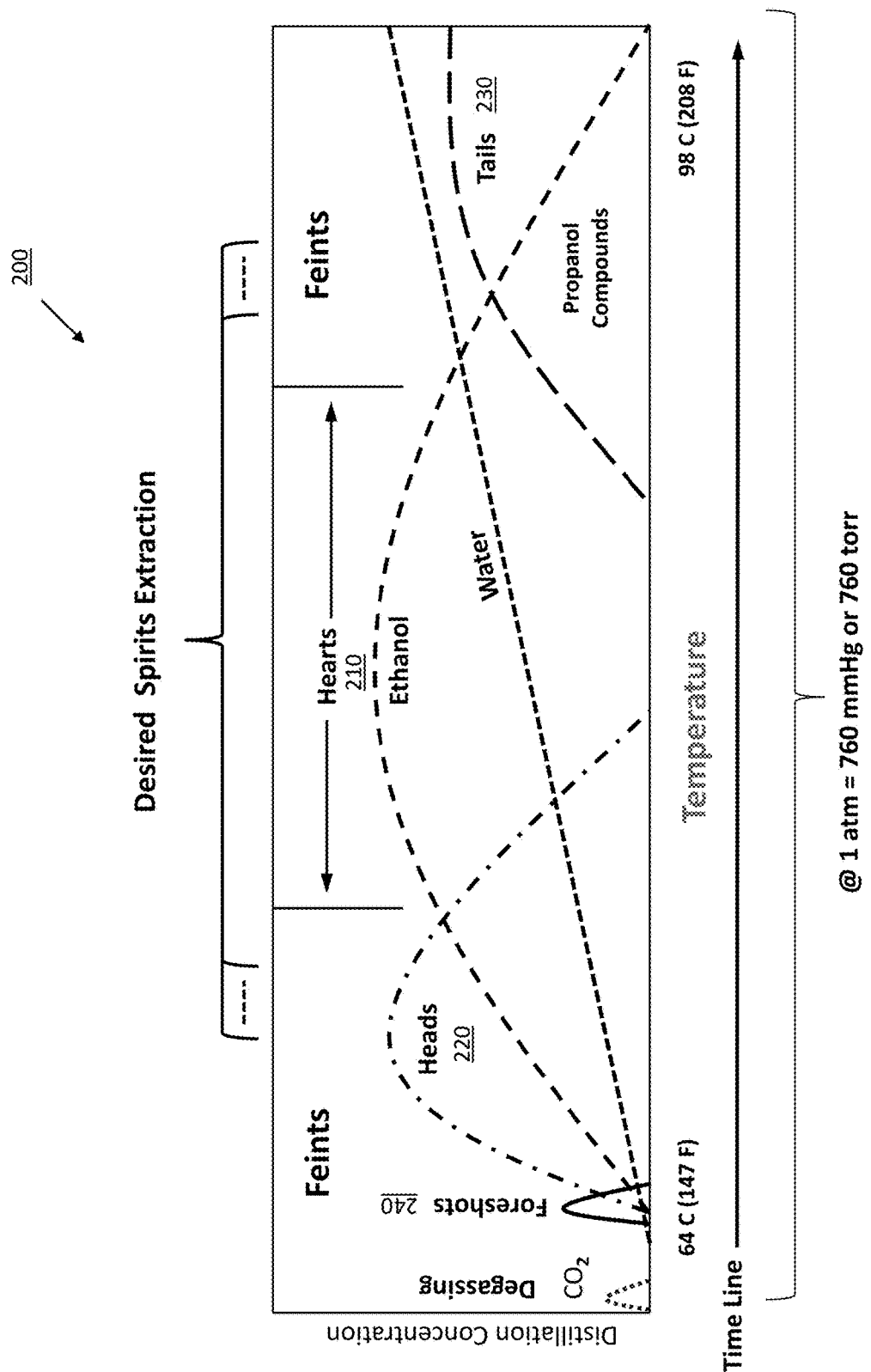
FIG. 2 is a graph of distillation component concentrations as a function of temperature in the prior art of spirit distillation of yeast fermented solutions performed at a constant pressure of 1 atmosphere (760 torr).

It is well known that during the fermentation process, a wide variety of chemical compounds are formed, some wanted and some unwanted. This can be up to the spirit manufacturer of what is cut from the distillation run. FIG. 2 presents the distillation distribution of yeast fermented solutions at atmospheric pressure. This process is used by distillers of sprits. The desired spirits extraction realm is the 'Hearts' 210 with a small portion of 'Heads' 220 and 'Tails' 230. As temperature is increased from 64 degrees C., the distillation run begins. Any $CO_2$ is removed at the onset of the distillation run. The first 0.25-0.5 percent of the distillation run time (x-axis), also known as the Foreshots 240, produces mainly congeners, or volatile chemical compounds such as methanol, acetone, and aldehydes. These are collected and discarded. As the temperature rises the Heads 220 are distilled, a high proof ethanol base but also containing esters, and light fusel oils. Next comes the Hearts 210, a relatively high-proof ethanol alcohol base, followed by the Tails 230 a low-proof mix containing propanols and heavy fusel oils. Once the temperature reaches about 98 degrees C. (208 degrees F.) the process is halted. The Heads and Tails are often set aside and added to the next distillation run. Distillers of alcohol spirits often mix the Hearts 210 with small quantities of Heads 220, Tails 230, to give their spirits a particular taste and aroma ('desired spirits extraction' region). This blend then is often aged and then the blend is diluted to a given proof of spirits. With too high a percentage of Heads or Tails, the drink tastes rough; with too little, it's bland. Foreshots 240 however are never mixed into the blend because they contain high levels of methanol, a poison, and are always discarded.

Figure 3:
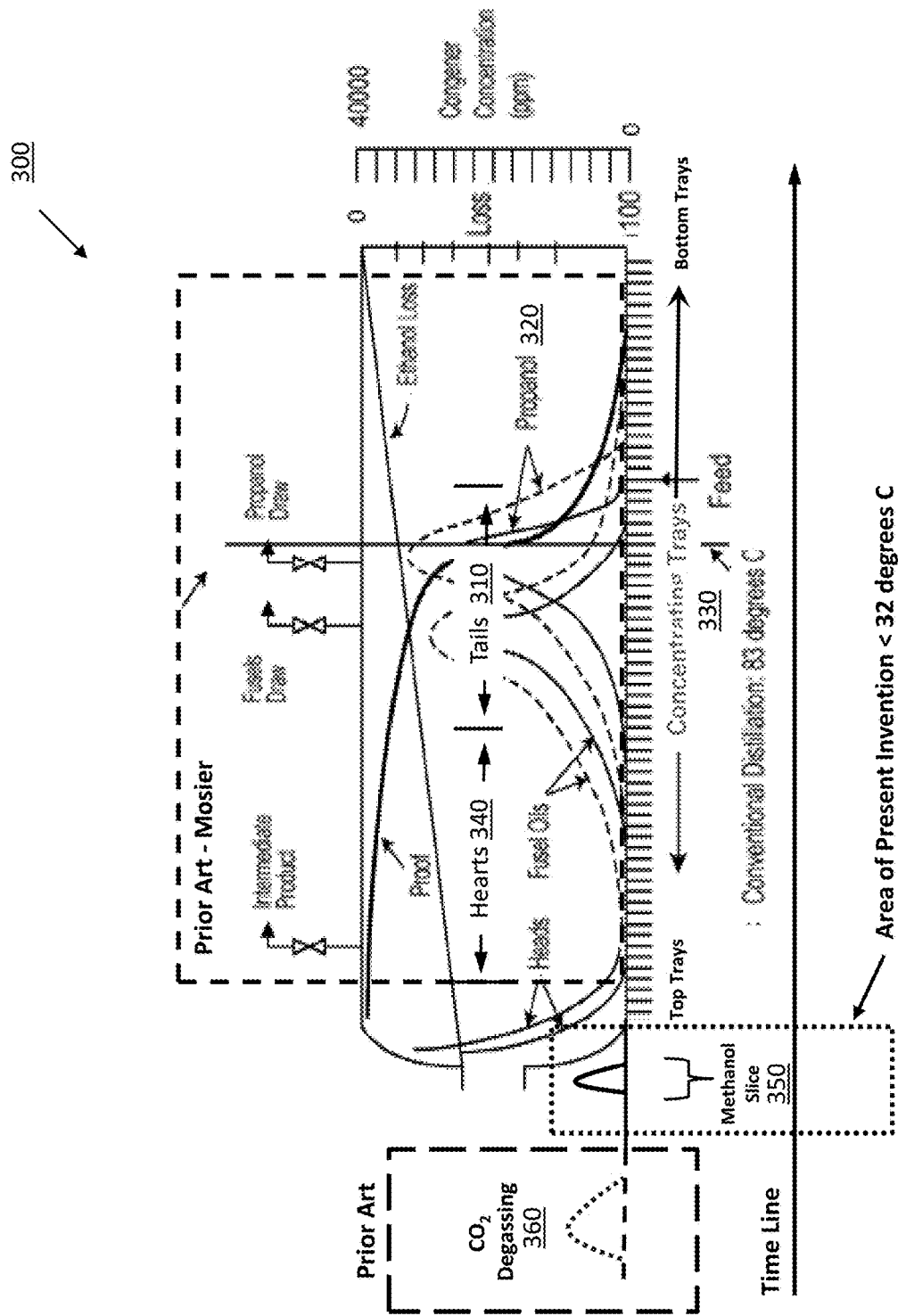
FIG. 3 is a graph of prior art spirits congener concentration and congener reduction achieved through the conventional distillation process (adapted from Mosier et al, U.S. Pat. No. 9,200,243) using a vertical still with concentrating trays. It presents a comparison of the present invention (Methanol Slice region) with conventional distillation.

FIG. 3 is a graph of spirits high-end "Tails" congener 310 concentration and prior art congener reduction (fusel oils and propanols) achieved through the conventional distillation process (adapted from Mosier et al, U.S. Pat. No. 9,200,243, col 22) in which the top concentrating trays are cooler than the bottom trays. The graph illustrates the concentration of fusel oils 310 and Propanol congeners 320 during conventional distillation as a function of the number of concentrating trays 330 in the rectifier column. Mosier states: "It is evident from the graph that for 40% ethanol distilled by boiling at 83 degrees Celsius in the conventional distillation, only a fraction of the propanol (~10%) and very little fusel oil (~1%) have been successfully removed. Further, more acceptable, but still poor and incomplete, removal of these congeners will require that the system be driven to 100 degrees Celsius, with concurrent ethanol product losses exceeding 30%". Thus, the conventional distillation process would convert any wine solution into Brandy, an undesirable result. It should be noted that the Mosier reference only deals with high end congeners, and not the low end 350 volatiles (methanol) nor the $CO_2$ degassing 360. In contrast, the method of the present disclosure reduces the "low end" Foreshot 350 congener (methanol) and the process is significantly less complicated than the prior art Mosier high-end congener removal using a column still. Although Mosier removes the Hearts 340 as an intermediate product, the Foreshots 350 (methanol) are not removed nor discussed. The process of the present invention (i.e. methanol slice) removes the Foreshots 350, by operating within the dotted line of FIG. 3. Another process well known in the art is the $CO_2$ degassing 360 of wine which allows the wine to clear, i.e. the particulates settle out.

Wine Making

Figure 4:
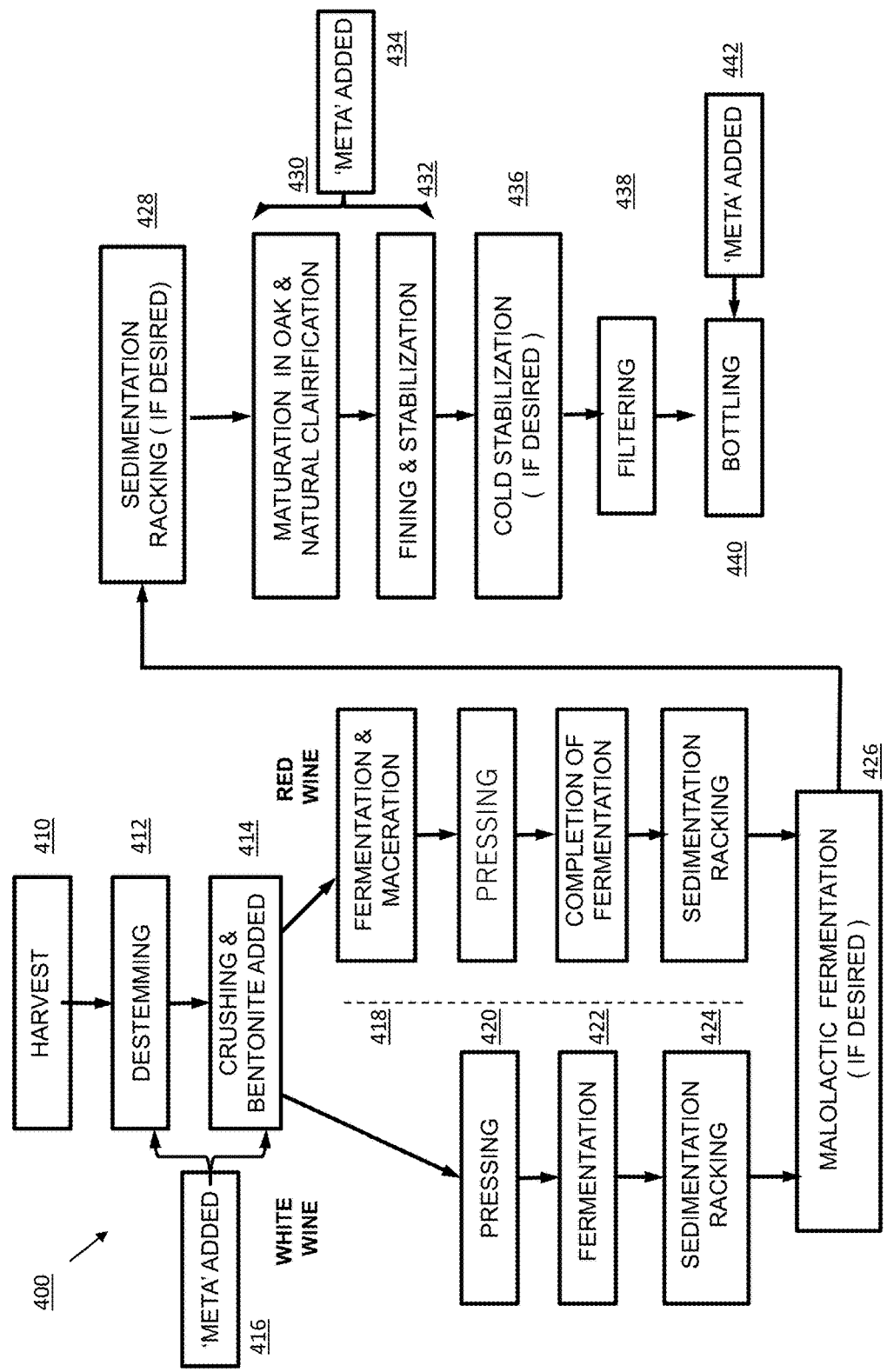
FIG. 4 is a flow chart for the traditional wine making from harvest through the process of fermentation, filtering, stabilizing and bottling.

Another heavily studied fermentation process is that of wine making. It is a very well-known process, one which occurs naturally in nature, the fermentation of grapes. FIG. 4 presents a flowchart 400 of the process of making white or red wine. Grapes are allowed to ripen, reaching a high sugar content, picked from vines 410, destemmed 412, and slightly crushed 414 to expose this inner sugar (pulp). The solution of juice and crushed grapes is referred to as "must". Grape skins become part of the must and add flavor, tannins, and the color in red wine. A preservative, such as Sodium Metabisulfite ($Na_2O_5S_2$) or Potassium Metabisulfite ($K_2O_5S_2$), known as 'Meta' in the trade, is often used to generate Sulfur Dioxide ($SO_2$) 416 to kill naturally occurring yeast, so that a controlled yeast inoculation can be used on the must in a day or two. A known yeast is then added to the must, which is allowed to ferment. The fermented must is then placed into a wine press 420 which separates the fermented liquid from the solids including the skins and seeds. White wines grapes are pressed prior to fermentation. This process often involves a week or two of fermentation 422, followed by racking 424 (the separation of dead yeast) and placed in oak barrels (if desired) for several months or years of ageing. The wine is then often filtered and then bottled. Secondary bacterial Malolactic conversion 426 can be used during or right after the main fermentation process. The malolactic bacteria convert malic acid to lactic acid. This technique removes the sharpness from the wine. After ageing 430, cold stabilization 436 is often used to reduce wine diamonds (i.e. tartaric crystals). Red and white wines can go through similar or different clarification, ageing or filtering techniques depending on the wine manufacturer. Additional sulfite preservatives at 434 and 442 (as needed) or stabilizing chemicals such as potassium sorbate can be used prior to bottling 440.

It should be noted that during the grape fermentation process the yeast produces a similar spectrum of compounds that occur in the spirit fermentation process using malted grains or sugars, but are not concentrated in a distillation process, except in the case of brandy. Wine can be distilled at atmosphere at an elevated temperature for its ethanol content. However, wine aromas and flavors are greatly destroyed, and the result is a clear spirit, called brandy, this being a full spectrum distillation similar to that of fermented grain distillation shown in FIG. 2.

Methanol Slicing of Wine

A process to reduce the headache-producing chemicals in wine, and thereby render a healthier product, is needed. Methanol is poisonous to humans and, even in small quantities, contributes substantially to headaches. To remove the small percent of methanol in wine a window methanol slice method has been developed. To avoid damaging the wine at elevated process temperature, we use a modified distillation method employing vacuum distillation. It is well known that liquids boil at lower temperatures under reduced pressure, and boil at higher temperatures at higher pressure. For instance, stovetop pressure cookers have been used for many years to speed up the cooking time of food. To reduce the amount of energy required to vaporize liquids a reduced pressure (less than atmospheric) can be used, resulting in a lower temperature to vaporize (i.e. boil) the liquid solution. Many drug manufacturers use vacuum-assisted vessels producing distillations at greatly reduced temperatures, thus creating specific products at lower temperatures that would not be possible at normal atmospheric pressure. The present invention applies this technique to the distillation of fermented solutions.

Figure 5:
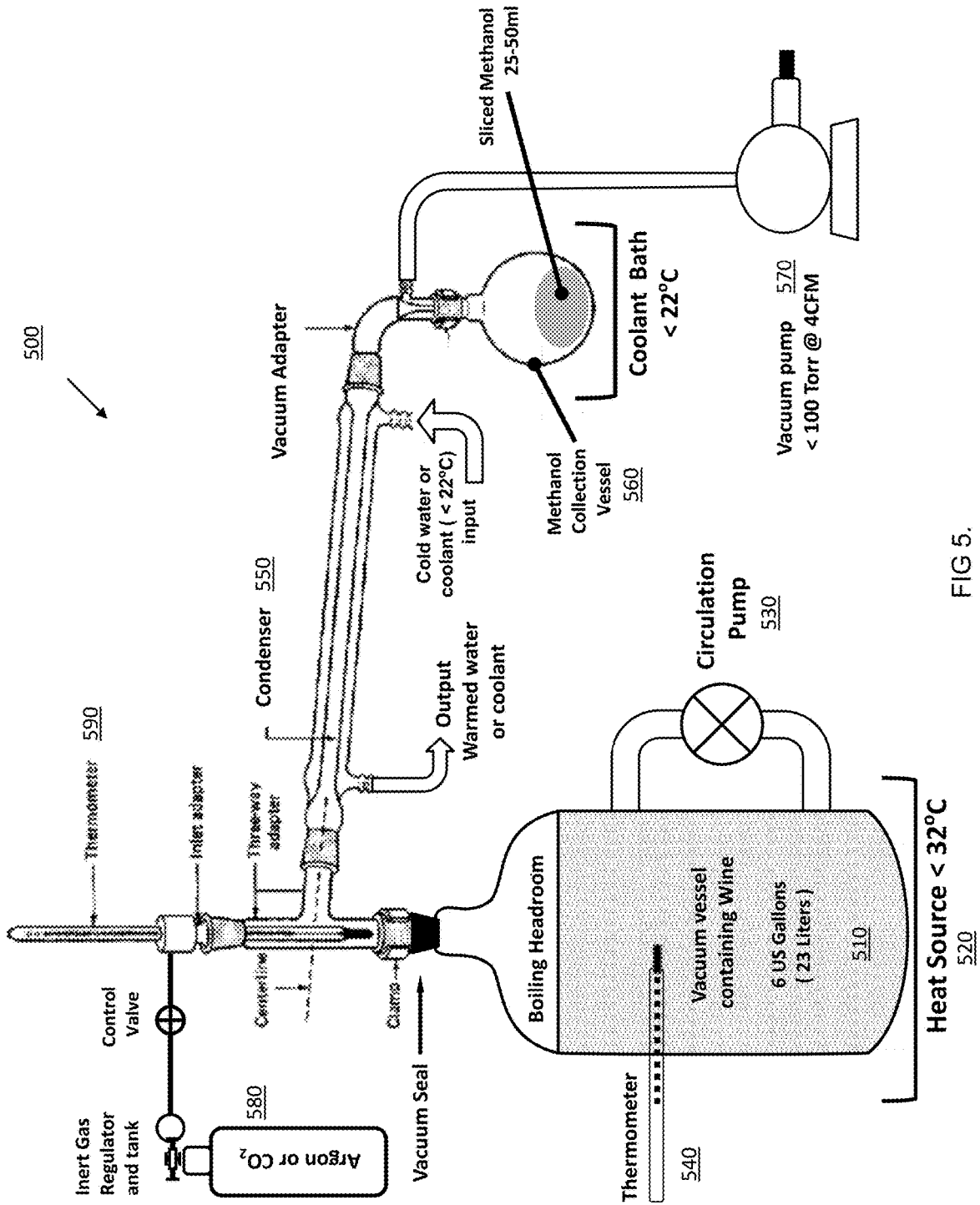
FIG. 5 is a schematic of a vacuum distillation apparatus used for methanol slicing in which the fermented alcohol solution is placed in a sealed vessel under a vacuum and heated by a heat source where the vapor is condensed to a collection vessel using a condenser.

FIG. 5 presents the schematic of a vacuum distillation apparatus for methanol slicing (methanol reduction) 500 in which the boiling point of the solution is lowered by placing the fermented solution under vacuum. The fermented alcohol solution 510 is placed in a vessel capable of withstanding being under vacuum and heated by a heat source 520. The wine may be circulated via one or more of several methods including magnetic stirrers or a circulation pump 530, however this is not mandatory. The temperature of the alcohol solution is monitored by a common physical bulb or electronic thermometer 540. The addition of ultrasonic transducers can be used to improve efficiency; as discussed in prior art (such as Mosier) regarding spirit manufacturing distillation. The vapor created by lowering the boiling point may be extracted by directly venting, through the vacuum pump 570, to the atmosphere. Alternatively, the methanol vacuum slicing process may include a condenser 550 cooled by cold water or coolant solution and a collection vessel 560. Coolant condenser temperature needs to be less than 22 degrees Centigrade for liquid methanol extraction. The entire apparatus is placed under a specific vacuum (less than atmospheric pressure) using a vacuum pump 570. A single stage or dual stage vacuum pump can be used.

The fermented alcohol solution, initially at room temperature, is slowly heated by the heat source 520 to the desired temperature as monitored by the digital thermometer 540 in the solution. The solution is held constant at the specified temperature and a vacuum is applied by the vacuum pump 570. The solution de-gasses, removing the $CO_2$. Next, methanol and the adjacent foreshot components vaporize, these components are cooled in the condenser 550 and collected in the methanol collection vessel 560. Typically, these condensation components are a tablespoon per gallon of fermented solution (also known in wine making as 'must'). In a typical 23-liter (6-gallon) methanol slice extraction, approximately 25-50 ml of condensation is removed. When the given extraction volume is reached, or a time limit is reached (at a given time, temperature, and vacuum level), or methanol creation ceases, the heat source is removed and the vacuum pump turned off. The point at which methanol creation ceases, at a fixed temperature and vacuum, may be measured via vapor temperature 590 or a reduction of condensate flow into the methanol collection vessel 560 or a change in vacuum 570. In some embodiments, the change in vacuum is measured in the condenser 550. In other embodiments, the change in vacuum is measured at the vacuum pump 570. Alternatively, while the solution is under vacuum, an inert gas 580 may be used to vent or back-fill and bring the vacuum vessel 510 back to atmospheric pressure. Other embodiments may utilize a gas or mass spectrometer (in place of, or in combination with, a thermometer 590) to monitor the vapor or liquid production, respectively, of methanol. While FIG. 5 illustrates an exemplary method, in some embodiments, while the solution is at room temperature, the vacuum may be applied first and then the solution temperature may be raised to a constant temperature. In some embodiments the solution temperature may be raised simultaneously with the vacuum application. In other embodiments, the vapor temperature 590 may be monitored for the cessation of methanol extraction. While in other embodiments, the slowing of condensate drips into the methanol collection vessel 560 may be monitored for the cessation of methanol extraction.

Figure 6:
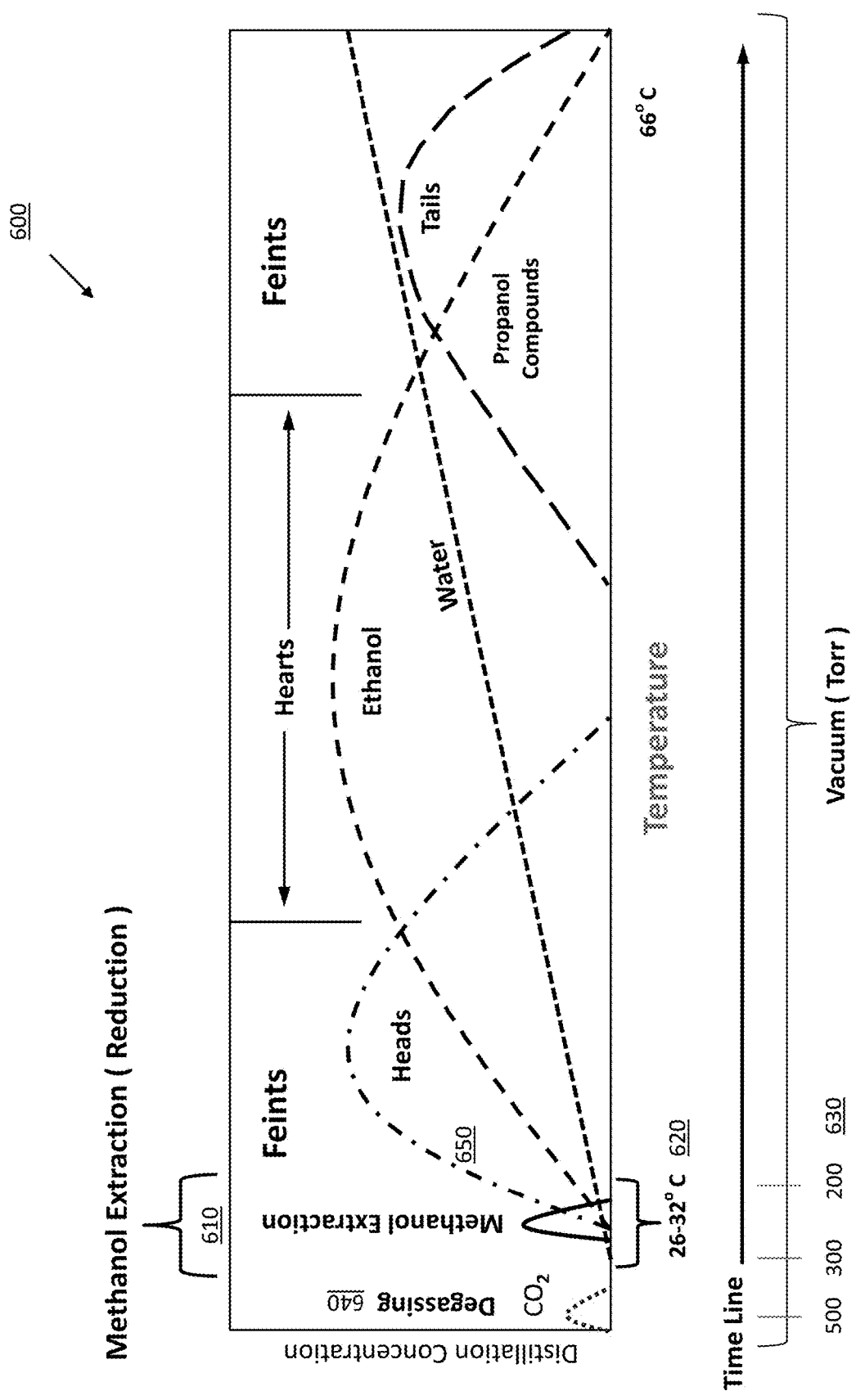
FIG. 6 is a graph of distillation concentration as a function of temperature for a yeast fermented solution under vacuum, i.e. less than atmospheric pressure (760 torr), to remove methanol in the present methanol slice invention process.

The vacuum distillation process for methanol extraction 610 (slicing) is further described in FIG. 6 which presents distillation concentration as a function of temperature and vacuum. The fermented wine is placed under vacuum of 500 to 50 torr 630, at a constant temperature 620, for example, in the range from 26-32 degrees C. In some embodiments, while the solution is at room temperature, the solution temperature may be raised to a constant temperature and then the vacuum applied, while in other embodiments the vacuum may be applied first and then the solution temperature may be raised to a constant temperature. Yet in some embodiments, the solution temperature may be raised simultaneously with the vacuum application. Operation within the temperature range 26 to 32 degrees C. limits ethanol loss and prevents the wine from being damaged as previously identified in the prior art. The solution is held at constant temperature and stable vacuum for a period of less than 60 minutes depending on the volume of liquid, the total alcoholic content of the wine (ABV), and the vacuum pump capacity (approximately 4 CFM or greater). This operating window of temperature 620, pressure 630 and time serves to only remove the $CO_2$ 640, the low-end methanol (methanol extraction 610) and nearby volatile (Foreshots) 650 components without substantially reducing the aromas, ethanol, propanols and taste of the wine. The resulting wine beverage retains the aroma and taste of wine with reduced methanol content, thereby reducing headache and hangover effects. It is important to control the time, temperature and vacuum pressure in this process to retain the wine's aroma and other natural components of the fermentation process, such as ethanol and propanols, and to minimally remove ethanol.

Figure 7:
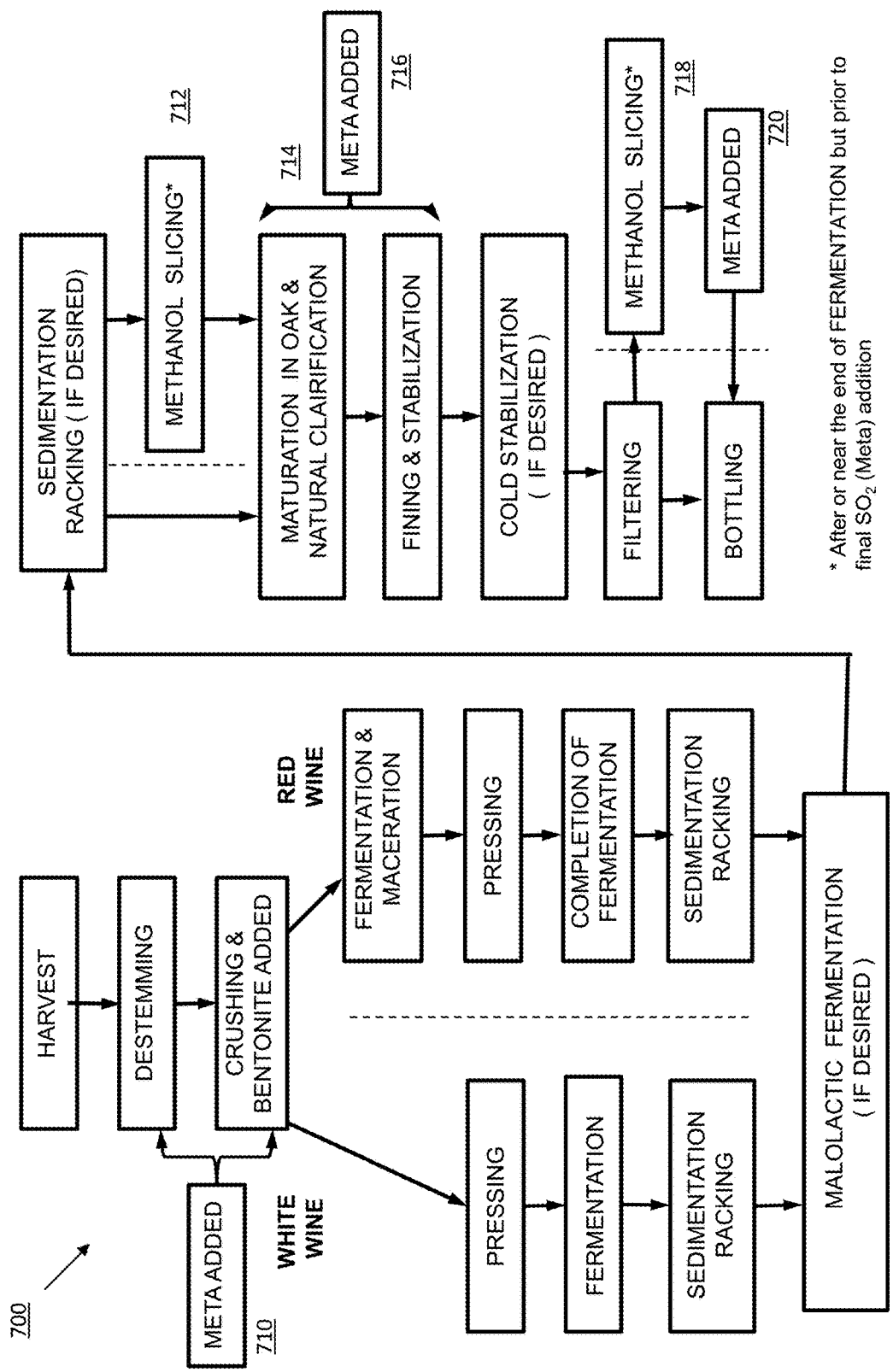
FIG. 7 is a flow chart for the making of wine showing $SO_2$ (Meta) addition after methanol slicing. The chart depicts the steps of harvest through the process of filtering and bottling in which methanol slicing may be applied at step 712 or step 718.

FIG. 7 presents a modification of FIG. 4 (the Wine Making flowchart) when incorporating the present methanol slicing invention. The addition of Meta ($SO_2$) at step 710 or step 716 is well known in the wine making prior art. The Methanol Slicing process may be applied at step 712 or step 718, with application at step 712 the preferred embodiment. The Methanol Slicing process can be implemented at any time after fermentation, such as after the maturation in oak (also known as ageing) process step 714. However, an addition of Meta (SO$_2$) 716 must follow any Methanol Slice. The free SO$_2$ is measured in the prior art wine making process during maturation 430 (ageing) and Meta is added 434 if necessary. But, when Methanol Slicing is performed at 712 or 718 it will remove free SO$_2$ from the wine. Thus, in some embodiments the Methanol Slicing 712 or 718 needs to be followed by an addition of Meta (SO$_2$) for stabilization at step 716 or 720, respectively. In other embodiments, higher doses of Meta may be added to the fermented solution prior to heating, before the methanol slicing step (712 or 718), to compensate for SO$_2$ loss during the methanol reduction process.

It is understood that the disclosed subject matter is not limited in its application to the details of process and to the arrangements of the apparatus set forth in the description or illustrated in the drawings. The disclosed subject matter is capable of other embodiments and of being practiced and carried out in various ways. Also, it is to be understood that the phraseology and terminology employed herein are for the purpose of description and should not be regarded as limiting. Although the present embodiment example processing 23 liters of fermented solution using a vacuum less than 500 torr was performed at a rate of 4 CFM for 30 minutes, other embodiments are covered by this disclosure.

As such, those skilled in the art will appreciate that the conception, upon which this disclosure is based, may readily be utilized as the basis for designing of other apparatus, methods and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter had been described and illustrated in the foregoing exemplary embodiments, it is understood that the present disclosure has been made only by way of example, and that numerous changes in the details of implementation of the disclosed subject matter may be made without departing from the spirit and scope of the disclosed subject matters. This includes, among other things, the scaling of the process and apparatus to commercially-viable production levels.

Further, while illustrative embodiments have been described herein, the scope of any and all embodiments having equivalent elements, modification, omissions, combination (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. These examples are to be construed as non-exclusive. Furthermore, the steps of the disclosed processes may be modified in any manner, including by reordering steps and/or inserting or deleting steps. It is intended, therefore, that the specification and examples be considered as illustrated only, with a true scope and spirit begin indicated by the following claims and their full scope of equivalents.

What is claimed is:

1. A method for reducing methanol content in a fermented solution, comprising:
    a. heating a fermented solution in a vacuum vessel to a fixed temperature, the fermented solution occupying a portion of the volume of the vessel;
    b. lowering a boiling point of the solution by pulling a vacuum within the vessel to create a vapor; and
    c. extracting the vapor, thereby producing a reduced methanol fermented solution without substantially reducing ethanol content.

2. The method of claim 1, wherein the fermented solution is heated to a fixed temperature of 32 degrees Celsius or less.

3. The method of claim 1, wherein the fermented solution boiling point is lowered to 32 degrees Celsius or less.

4. The method of claim 1, wherein extracting the vapor is performed using a condenser.

5. The method of claim 1, wherein extracting the vapor is performed for less than 60 minutes for 23 liters of solution.

6. The method of claim 2, wherein the fermented solution is heated using one of a water bath and a submersible heating coil.

7. The method of claim 1, wherein the resulting condensate is monitored for generation of methanol.

8. The method of claim 2, wherein the fermented solution temperature is monitored for generation of methanol.

9. The method of claim 1, wherein the reduced methanol fermented solution is returned to room temperature and pressure when the generation of methanol substantially ceases.

10. The method of claim 1, wherein said fermented solution is wine.

11. The method of claim 1, wherein said fermented solution is beer.

12. The method of claim 1, wherein Meta is added to the fermented solution prior to heating to compensate for SO$_2$ loss during the methanol reduction.

\* \* \* \* \*